(12) United States Patent
Dutoit (10) Patent No.: US 9,109,968 B2
(45) Date of Patent: Aug. 18, 2015

(54) STRAIN SENSOR APPARATUS AND METHOD OF STRAIN SENSING

(75) Inventor: Dana Dutoit, Chaska, MN (US)

(73) Assignee: OMNI-SENS SA, Morges (CH)

( * ) Notice: Subject to any disclaimer, the term of this patent is extended or adjusted under 35 U.S.C. 154(b) by 73 days.

(21) Appl. No.: 13/978,578

(22) PCT Filed: Jan. 11, 2012

(86) PCT No.: PCT/EP2012/050346
§ 371 (c)(1),
(2), (4) Date: Jul. 8, 2013

(87) PCT Pub. No.: WO2012/098036
PCT Pub. Date: Jul. 26, 2012

(65) Prior Publication Data
US 2013/0286378 A1    Oct. 31, 2013

(30) Foreign Application Priority Data

Jan. 20, 2011 (CH) .................................... 0095/11

(51) Int. Cl.
| G01B 11/16 | (2006.01) |
| G01B 11/26 | (2006.01) |
| G01B 11/14 | (2006.01) |
| G01L 1/24  | (2006.01) |
| E21B 47/00 | (2012.01) |

(52) U.S. Cl.
CPC ............. *G01L 1/242* (2013.01); *E21B 47/0001* (2013.01); *E21B 47/0006* (2013.01)

(58) Field of Classification Search
CPC ............... A61B 1/00165; A61B 19/22; A61B 19/2203; G02B 6/022; G02B 6/02042; G01D 5/35303; G01D 5/353; E21B 17/015; E21B 47/0006; G01B 11/165; G01B 7/18; G01B 11/18; G01L 1/246; G01M 11/085

USPC ........... 356/32, 138, 139.05, 152.1, 614, 620; 73/862, 624
See application file for complete search history.

(56) References Cited

U.S. PATENT DOCUMENTS

| 2006/0013523 A1 | 1/2006 | Childers et al. |
| 2007/0156019 A1* | 7/2007 | Larkin et al. .................. 600/104 |

(Continued)

FOREIGN PATENT DOCUMENTS

| EP | 1635034 A1 | 3/2006 |
| WO | 2010028387 A2 | 3/2010 |

OTHER PUBLICATIONS

International Search Report dated Jun. 11, 2012 for application PCT/EP2012/050346.

*Primary Examiner* — Tarifur Chowdhury
*Assistant Examiner* — Sunghee Y Gray
(74) *Attorney, Agent, or Firm* — Pearne & Gordon LLP (57) ABSTRACT

According to the present invention there is provided a strain sensor apparatus comprising, two or more strain sensors each of which is capable of measuring strain and each of which is configured such that it can be arranged to cooperate with a structure to be monitored so that strain in the structure can be detected by a strain sensor, and one or more position references which is/are arranged in a predetermined position relative to the two or more strain sensors and wherein the one or more position references are each configured such that they are suitable for cooperating with a measuring means; one or more measuring means which is configured to cooperate with the one or more position references so that the angular orientation of the one or more position references can be determined. There is further provided a corresponding method for sensing strain in a structure.

23 Claims, 4 Drawing Sheets

(56) References Cited

U.S. PATENT DOCUMENTS

| | | | |
|---|---|---|---|
| 2010/0134782 A1* | 6/2010 | Roberts et al. | 356/32 |
| 2010/0238427 A1* | 9/2010 | Sasaoka et al. | 356/73.1 |
| 2011/0176125 A1* | 7/2011 | Smith et al. | 356/32 |

* cited by examiner

STRAIN SENSOR APPARATUS AND METHOD OF STRAIN SENSING

FIELD OF THE INVENTION

The present invention concerns a strain sensor apparatus, and in particular but not exclusively a strain sensor apparatus which comprises a means for acutely determining the direction of the strain sensed by the strain sensor apparatus.

DESCRIPTION OF RELATED ART

In many fields of application, like pipeline, power cables or subsea, the use of measuring apparatuses to monitor continuously structural and/or functional parameters is well known. The measuring apparatuses can be applied also to the civil engineering sector, and in particular in the field of the construction of structures of great dimensions.

The measuring apparatuses are commonly used to control the trend over time of the temperature or of the strain, i.e. of the geometrical measure of the deformation or elongation resulting from stresses and defining the amount of stretch or compression along the fibre, of the respective structure. In more detail, these measuring apparatuses are suitable to give information of local nature, and they can be therefore used to monitor, as a function of the time, the temperature or the strain associated with a plurality of portions and/or of components of the engineering structure to be monitored, providing useful information on leak, ground movement, deformation, etc. of the structure.

Among the measuring apparatuses used to monitor the status of engineered or architectonic structures, the optoelectronic devices based upon optical fibres have a great significance. In particular, these apparatuses normally comprise an electronic measuring device, provided with an optical fibre probe which is usually in the order of a few tens of kilometers. In use, this optical fibre is coupled stably to, and maintained substantially into contact with, portions or components of the engineered structure, whose respective physical parameters shall be monitored. For example, this optical fibre can run along the pipes of an oil pipeline, or it can be immersed in a concrete pillar of a building, so that it can be used to display the local trend of the temperature or of the strain of these structures. In other words these optoelectronic devices comprise fibre optical sensors, i.e. sensors using the optical fibre as the sensing element. Fibre optical sensors can be:

- point sensors, wherein only one location along the optical fibre is made sensitive to the temperature and/or the strain;
- quasi-distributed sensors or multiplexed sensors, wherein many point sensors are connected to each other by an optical fibre and multiplexed along the length of the fibre; or
- distributed or fully distributed sensors, wherein the optical fibre is a long uninterrupted linear sensor.

These measuring instruments based upon optical fibres can be subdivided into various types depending upon both the physical quantity/ies they are suitable to measure and the physical principle used to detect this quantity/these quantities.

When a powerful light pulse of wavelength $\lambda_0$ (or frequency $\nu_0 = c/\lambda_0$, wherein c is the speed of light), known as the pump, propagates through an optical fibre, a small amount of the incident power is scattered in every directions due to local non-homogeneities within the optical fibre. If the optical fibre is a single-mode fibre (SMF), i.e. a fibre designed for carrying a single ray of light (mode) only, then only forward and backward scattering are relevant since the scattered light in other directions is not guided. Backscattering is of particular interest since it propagates back to the fibre end where the laser light was originally launched into the optical fibre.

Scattering processes originate from material impurities (Raleigh scattering), thermally excited molecular vibrations: acoustic phonon (Brillouin scattering) and optical phonon (Raman scattering).

Distributed sensing techniques rely on the analysis of the backscattered signal created at different location along the fibre.

RAYLEIGH SCATTERING is the interaction of a light pulse with material impurities. It is the largest of the three backscattered signals in silica fibres and has the same wavelength as the incident light. Rayleigh scattering is the physical principle behind Optical Time Domain Reflectometer (OTDR).

BRILLOUIN SCATTERING is the interaction of a light pulse with thermally excited acoustic waves (also called acoustic phonons). Acoustic waves, through the propagating pressure, slightly, locally and periodically modulate the index of refraction. The corresponding moving grating reflects back a small amount of the incident light and shifts its frequency (or wavelength) due to the Doppler Effect. The shift depends on the acoustic velocity in the fibre while its sign depends on the propagation direction of the travelling acoustic waves. Thus, Brillouin backscattering is created at two different frequencies around the incident light, called the Stokes and the Anti-Stokes components. In silica fibres, the Brillouin frequency shift is in the 11 GHz range (0.1 nm in the 1550 nm wavelength range) and is temperature and strain dependent.

RAMAN SCATTERING is the interaction of a light pulse with thermally excited atomic or molecular vibrations (optical phonons) and is the smallest of the three backscattered signals in intensity. Raman scattering exhibits a large frequency shift of typically 13 THz in silica fibres, corresponding to 100 nm at a wavelength of 1550 nm. The Raman Anti-Stokes component intensity is temperature dependent whereas the Stokes component is nearly temperature insensitive.

Figure 4:
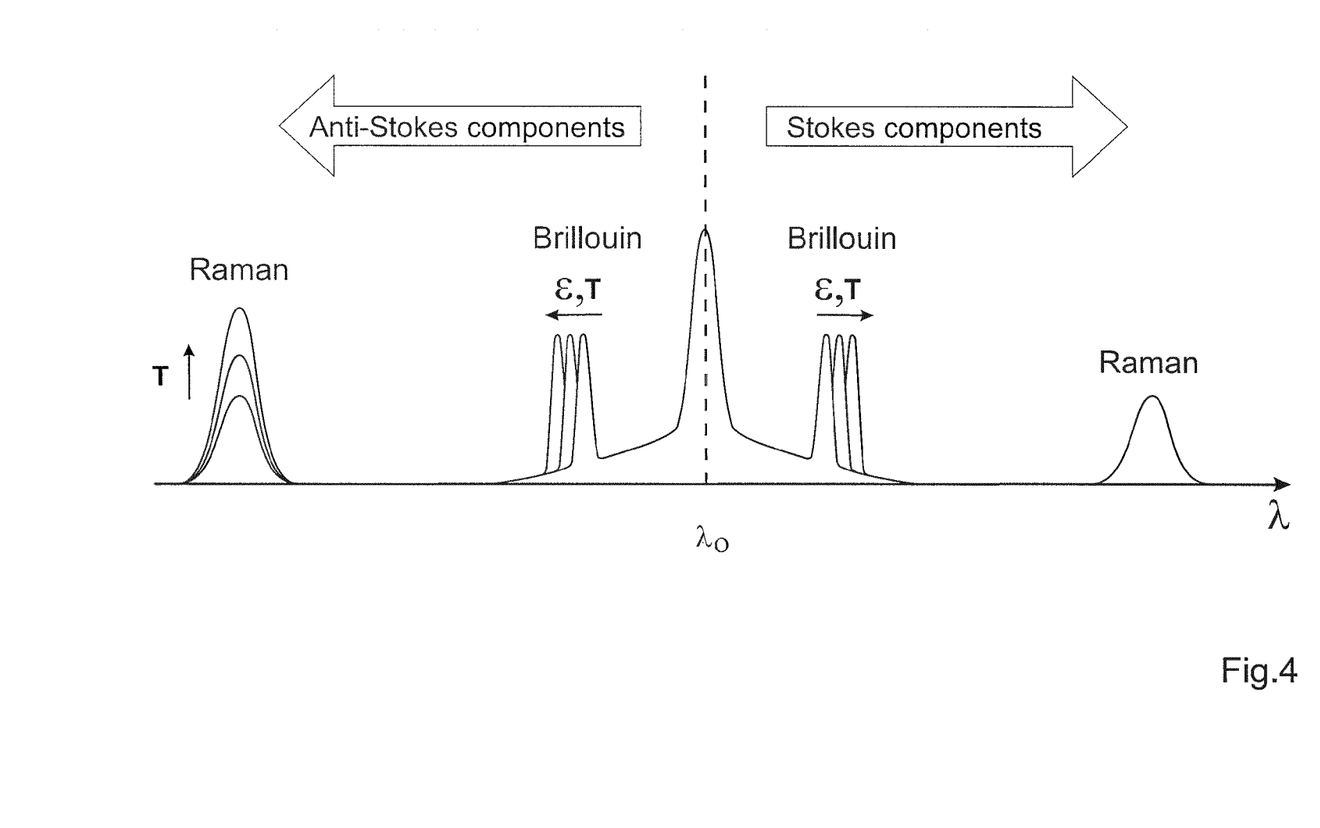
FIG. 4 schematically shows a spectrum of the backscattered light generated at every point along an optical fibre when a laser light is launched in the optical fibre.

FIG. 4 schematically shows a spectrum of the backscattered light generated at every point along the optical fibre when a laser light is launched in the optical fibre. The higher peak, at the wavelength $\lambda_0$, corresponding to the wavelength of a single mode laser, is the Rayleigh peak, originated from material impurities. The so-called Stokes components and the so-called anti-Stokes components are the peaks at the right side respectively left side of the Rayleigh peak. The anti-Stokes Raman peak, originated from optical phonon, has an amplitude depending on the temperature T. The Stokes and anti-Stokes Brillouin peaks, generated from thermally excited acoustic waves, have a frequency depending on the temperature T and on the strain $\epsilon$.

The Brillouin shift (wavelength position with respect to the original laser light) is an intrinsic physical property of the fibre material and provides important information about the strain and temperature distribution experienced by an optical fibre.

The frequency information of Brillouin backscattered light can be exploited to measure the local temperature or strain information along an optical fibre. Standard or special single-mode telecommunication fibres and cables can be used as sensing elements. The technique of measuring the local temperature or strain is referred to as a frequency-based technique since the temperature or strain information is contained in the Brillouin frequency shift. It is inherently more reliable and more stable than any intensity-based technique, such as the Raman effect, which are sensitive to drifts, losses and variations of attenuations. As a result, the Brillouin based technique offers long term stability and large tolerance to attenuation. —This process of propagating a pulse of light into the optical fibre and measuring the backscattering signal is called Spontaneous Brillouin Scattering (SPBS): it is a weak processing which leads to a low intensity scattered light.

The Brillouin scattering process has the particularity that it can be stimulated by a second optical signal—called the probe—in addition to the first optical signal—called the pump—that generated the scattering, providing that the probe fulfils specific phase matching conditions. This property is especially interesting for sensing applications and can be achieved by the use of a probe counter propagating with respect to the pump. Stimulation is maximized when pump and probe frequencies (or wavelengths) are exactly separated by the Brillouin frequency shift. In this case, the energy transferred from the pump to the probe (or vice and versa depending on the selected Stokes/anti-Stokes backscattering signal) results in a greatly enhanced backscattered intensity and thus a larger Signal-to-Noise Ratio (SNR). This is seen as a resonant phenomenon where an amplification of the probe power occurs at the expense of the pump when the resonant condition is fulfilled, i.e. when the frequency difference between pump and probe matches the local Brillouin frequency.

In the known solutions the pump is composed by one or more nanoseconds long optical pulses and the probe by a Continuous Wave—CW light, as it will be discussed.

Optoelectronic measurement devices based on Stimulated Brillouin Backscattering (SBS) are known as Brillouin Optical Time-Domain Analyser or BOTDA; as opposed to Brillouin Optical Time-Domain Reflectometers (BOTDR) which are based on spontaneous Brillouin backscattering (SPBS).

An optoelectronic measurement device based on BOTDA normally performs a frequency domain analysis and a time domain analysis.

Frequency domain analysis: the temperature/strain information is coded in the Brillouin frequency shift. Scanning the probe frequency with respect to the pump while monitoring the intensity of the backscattered signal allows to find the Brillouin gain peak, and thus the corresponding Brillouin shift, from which the temperature or the strain can be computed. This is achieved by using two optical sources, e.g. lasers, or a single optical source from which both the pump signal and the probe signal are created. In this case, an electro-optic modulator (typically a telecommunication component) is used to scan the probe frequency in a controlled manner.

Time domain analysis: due to the pulsed nature of the pump, the pump/probe interaction takes place at different location along the fibre at different times. For any given location, the portion of probe signal which interacted with the pump arrives on a detector after a time delay equal to twice the travelling time from the fibre input to the specified location.

Thus, monitoring the backscattered intensity with respect to time, while knowing the speed of light in the fibre, provides information on the position where the scattering took place.

Typical commercial optoelectronic measurement devices based on BOTDA can measure temperature/strain over 30 km of fibre with a spatial resolution of 1 m (equivalent to 30,000 distinct independent sensors). The resolution on temperature is typically <1 K and is typically 20µε for strain.

In addition to fibre optics-based distributed measurement, strain information can be measured point by point using for instance Fibre Bragg Grating (FBG) or mechanical strain gauge.

Two or more optical fibers may be arranged to cooperate with different parts of a structure; for example, two or more optical fibers may be arranged to extend along a length of a pipe, each positioned at a different point on the pipe's circumference, such as at the '12 o clock' position and '3 o clock' position respectively. Carrying out distributed sensing techniques using each of the optical fibers, the magnitude and position of strain along the length of the pipe, which is in a vertical plane with respect to the pipe i.e. at the '12 o clock' position and in a horizontal plane with respect to the pipe i.e. at the '3 o clock' position, can be determined. Measuring the direction of strain is of particular interest in wells (either oil well, geothermal well) or any borehole (for example mining). In these cases, the relevant information has to do with lateral displacement (shear strain) due to ground movement at different depths. It is also of interest for other structure like subsea risers, umbilicals or even flow-lines and pipelines for which fatigue is monitored.

However, problems arise when structure which is being monitored becomes twisted; for example a 10 km sub-sea pipe may easily become twisted during installation. The twisting of the pipe will ensure that the optical fibers are no longer located at the '12 o clock' position and '3 o clock' position, respectively. Thus, because of the twisting of the pipe, the strain indicated by the optical fiber originally located at the '12 o clock' position on the circumference of the pipe, cannot be concluded to be strain which is applied in the vertical plane with respect to the pipe. Likewise, because of the twisting of the pipe, the strain indicated by the optical fiber originally located at the '3 o clock' position on the circumference of the pipe, cannot be concluded to be strain which is applied in the horizontal plane with respect to the pipe. Thus, existing strain sensor apparatuses are unable to detect the direction of strain applied to structure accurately. As a result, it is also not possible to accurately determine bending orientation of a structure using exiting strain sensor apparatuses.

US2006/013523 is directed toward a fiber optic position and shape sensing device and the method of use. The device comprises an optical fiber means. The optical fiber means comprises either at least two single core optical fibers or a multicore optical fiber having at least two fiber cores. In either case, the fiber cores are spaced apart such that mode coupling between the fiber cores is minimized. An array of fiber Bragg gratings are disposed within each fiber core. A broadband reference reflector is positioned in an operable relationship to each fiber Bragg grating wherein an optical path length is established for each reflector/grating relationship. A frequency domain reflectometer is positioned in an operable relationship to the optical fiber means. In use, the device is affixed to an object. Strain on the optical fiber is measured and the strain measurements correlated to local bend measurements. Local bend measurements are integrated to determine position or shape of the object.

BRIEF SUMMARY OF THE INVENTION

According to the present invention there is provided a strain sensor apparatus comprising,
two or more strain sensors each of which is capable of measuring strain and each of which is configured such that it can be arranged to cooperate with an elongate tubular structure to be monitored, along the length of the elongate tubular structure, so that strain in the structure can be detected by a strain sensor, and one or more position references which is/are arranged, along the length of the elongate tubular structure, in a predetermined position relative to the two or more strain sensors and wherein the one or more position references are each configured such that they are suitable for cooperating with a measuring means;

one or more measuring means which is configured to cooperate with the one or more position references so that the angular orientation of the one or more position references, with respect to a reference position, can be determined.

The strain sensor apparatus may be, for example, integrated into a pipe, such as a sub-sea pipe. For example, three strain sensors may be arranged to be evenly distributed along a circumference of the sub-sea pipe (e.g. at 0° with respect to a reference position (i.e. at "12 o clock"), 120° with respect to a reference position ("4 o clock") and 240° with respect to a reference position ("8 o clock") positions respectively), and the one position reference, may each be configured to extend along the length of the sub-sea pipe allowing strain over the length of the sub-sea pipe to be measured. The three strain sensors and the one position reference, may be so that they are each integral to the sub-sea pipe. Over long lengths of the sub-sea pipe e.g. 10 km, at least a portion of the sub-sea pipe may become twisted though an unknown angle. As the three strain sensors are integral to the sub-sea pipe the strain sensors will twist with the sub-sea pipe so that they are no longer located at a "12 o clock", "4 o clock" and "8 o clock" positions, respectively; accordingly strain detected by a strain sensor will not accurately reflect the position on the circumference of the pipe at which strain is present i.e. direction of strain applied to the sub-sea pipe. For example, if the strain sensor located originally at a "12 o clock" position (0°) detects that strain is present at the twisted portion of the sub-sea pipe, because of the twisting of the pipe, the detected strain is not necessarily applied at the top (i.e. at "12 o clock" position) of the circumference of sub-sea pipe. The present invention solves this problem by using a measurement means to determine the angular orientation of the reference position in the twisted portion of the pipe; as the reference position is in an fixed known angular orientation relative to the three strain sensors, the angular orientation of the three strain sensors can be determined from the measured angular orientation of the reference position. Knowing the angular orientation of the three strain sensors, the direction in which strain is applied to the sub-sea pipe can be determined accurately. For example, if the measurement means indicates that the position reference has been moved 180° due to the twisting of the sub-sea pipe, then it can be concluded that the strain sensor which was originally located at the "12 o clock" position has also been moved through 180°; it can thus be concluded that the strain detected by the strain sensor which was originally located at the "12 o clock", at the twisted portion of the pipe, is strain which is applied to the bottom sub-sea pipe i.e. at the "6 o clock" position on the pipe circumference. Thus, the present invention enables the direction of strain in structures to be accurately determined.

The present invention, allows installation induced twist to be determined so that the position of the strain sensor(s) can be defined. Accordingly, bending strain and also bending direction can be determined.

Strain is a geometrical measure of deformation representing the relative displacement between particles in a material body, i.e. a measure of how much a given displacement differs locally from a rigid-body displacement.

The strain sensor apparatus may be arranged to cooperate with a tubular structure. In the present application the term "tube" or "tubular" means any elongate structure; it includes but is not limited to elongate cylindrical structures which have a hollow centres, such as risers, pipes, flowlines and pipelines, and also includes elongate cylindrical structures which have or do not have hollow centres such as umbilicals and cables such as electrical cables and powercables.

The two or more strain sensors may each be configured to be elongate. The two or more strain sensors may each be arranged to cooperate with a tubular structure, along a length of the tubular structure, such that the direction of strain along a length of the tubular structure can be measured. Each strain sensors may comprise a central axis and each strain sensor may extend along its respective axis so that each strain sensor has an elongate configuration.

The one or more position references may each be configured to be elongate. The one or more position references may each be arranged to cooperate with a tubular structure, along a length of the tubular structure. Each position reference may comprise a central axis and each position reference may extend along the central axis so that each position reference has an elongate configuration.

The tubular structure may comprises a longitudinal axis and the two or more strain sensors and the one or more position references may each be configured to extend parallel to the longitudinal axis of the tubular structure. The one or more position references may each be configured to extend in a helical configuration along the tubular structure. The two or more strain sensors may be configured to extend in a helical configuration along the tubular structure and/or to extend parallel to the longitudinal axis of the tubular structure.

The two or more strain sensors may each comprise at least one optical fiber. The two or more strain sensors may each comprise a plurality of optical fibers.

The at least one optical fiber of each of the two or more strain sensors may be arrangeable to cooperate with a structure which is to be monitored for strain, such that strain in the structure will impart strain in the optical fiber. The at least one optical fiber of each of the two or more strain sensors may be arranged to be integral to a structure which is to be monitored for strain. At least one optical fiber of each of the two or more strain sensors may be symmetrically positioned along a circumference of a tubular member which is to be monitored.

An optical fiber of each of the two or more sensors may be symmetrically positioned around a circumference of a tubular structure which is to be monitored for strain.

The two or more strain sensors may comprise a means for carrying out distributed fiber optic analysis. The means for carrying out distributed fiber optic analysis may be an interrogator which can carry out Brillion scattering analysis. The two or more strain sensors may each comprise at least one optical fiber which is arranged to cooperate with a structure to be monitored, wherein each optical fiber is arranged in optical communication with an interrogator unit which is configured to carry out distributed fiber optic analysis to detect strain in an optical fiber.

The distributed fiber optic analysis may comprise Brillouin scattering analysis. The distributed fiber optic analysis may comprise coherent Rayleigh scattering. The Brillouin scattering analysis may comprise spontaneous Brillouin scattering analysis which relies on the detection and the analysis of the backscattered signal due to a modulated pump signal. The Brillouin scattering analysis may comprise stimulated Brillouin scattering analysis which relies on the detection and the analysis of a backscattered lightwave which is the product of the interaction of a pump signal and a probe signal.

The means for carrying out distributed fiber optic analysis may comprise an interrogator unit. The interrogator unit may comprise a Brillouin Optical Time Domain Reflectometer, an Optical Frequency Domain Reflectometer (BOFDR), a Brillouin Optical Correlation-Domain Reflectometer (BOCDR), a Brillouin Optical Time Domain Analyzer and/or means for carrying out Brillouin optical Frequency-domain analysis (BOFDA) an/or means for carrying out Brillouin optical correlation-domain analysis (BOCDA.

In order to implement spontaneous Brillouin scattering the Brillouin Optical Time Domain Reflectometer may generate an optical pump signal which is sent along the optical fiber of a strain sensor. As the pump signal propagates along the optical fiber a portion of the pump signal will be backscattered due to thermally excited acoustic phonons in the optical fiber, to provide a backscattered signal. Strain induced on the optical fiber will influence the optical properties of the optical fiber; thus causing at least some local modification of the characteristics of the backscattered signal. The backscattered signal is detected; a detection of a local change in the optical characteristics of the backscattered light will indicate the presence of strain along the optical fiber. It should be noted that the optical fiber will be secured to a structure e.g. a sub-sea pipe, which is to be monitored for strain; strain present in the structure will induce strain in the optical fiber. By analysing the time of flight of the portion of the backscattered light which has a local change in its optical characteristics, the precise location along the optical fiber, and thus the precise location along the structure, where strain is present can be determined.

In order to implement stimulated Brillouin scattering, for example, a Brillouin Optical Time Domain Analyzer is used to generate an optical pump signal which it sends, in a first direction, through a first end of an optical fiber of each strain senor. The Brillouin Optical Time Domain Analyzer also generates a probe signal which it sends in a second direction, through a second, opposite, end, an optical fiber of each strain senor. The probe signal will promote the generation of a backscattered signal so that the backscattered signal is easier to detect. Strain at a point along an optical fiber, will modify the optical properties of the optical fiber at that point; the modification of the optical properties of the optical fiber will locally change the interaction of the pump signal and the probe signal within the optical fiber. The change of the interaction of the pump signal and probe signal will cause at least some local modification of the characteristics of the backscattered signal. The backscattered signal is detected; a detection of a local change in the optical characteristics of the backscattered light will indicate the presence of strain along the optical fiber. It should be noted that the optical fiber will be secured to the structure e.g. a pipe, which is to be monitored for strain; strain present in the structure will induce strain in the optical fiber. By analysing the time of flight of the portion of the backscattered light which has a local change in its optical characteristics, the precise location along the optical fiber, and thus the precise location along the structure, where strain is present can be determined The one or more position references may each be configured such that they can be arranged to cooperate with a structure to be monitored. The one or more position references may each be integral to a structure which is to be monitored for strain.

The strain sensor apparatus may comprise a plurality of position references.

The one or more position references may comprise a reference marking which is configured such that it is visible on a camera image of the marking. The reference marking may be at least one or a coloured strip, or coloured marking, a groove, a channel, or a projection. The coloured strip, or coloured marking may have a colour which is different to a colour of the surface of the structure with which is cooperates. The one or more position references may comprise a track along which a measuring means can move. The track may be defined by one or more of the following: one or more grooves; one or more protrusions; one or more rails; one or more magnets which are configured to provide magnetic guiding; or a marking which can be followed by a measurement means e.g. an optical marking which is configured to provide an optical guide. The one or more grooves may have any suitable cross section; for example the one or more grooves may have a V-shape, square-shape, rectangular-shape, and/or curved-shape cross section. The one or more protrusions may have a V-shape, square-shape, rectangular-shape, and/or circular-shape cross section.

The one or more position references may be positioned on an inner surface of a structure which is to be monitored for strain. For example the one or more position references may be positioned on an inner surface of a sub-sea pipe. The one or more position references may be positioned on an outer surface of a structure which is to be monitored for strain. The one or more position references may be integral and/or embedded in a structure which is to be monitored for strain.

The strain sensor apparatus may comprise a plurality of measuring means.

The measuring means may comprise a means for cooperating with a track which defines a position reference, so that the measuring means can move along the track. The means for cooperating with a track may be a rail which can receive a portion of the track.

The measuring means may comprise a camera.

The measuring means may comprise a means for measuring angular orientation. The means for measuring angular orientation may be at least one selected from the group comprising; a gyroscope, a accelerometer, a GPS or any type of inertial platform used for navigation purposes. For example, three accelerometers may be positioned at three different directions on a vehicle which mechanically cooperates with the one or more position references to move along the one or more position references. The three accelerometers are arranged on the vehicle to measure the acceleration of the vehicle along three different axes. As the vehicle is moved to along the one or more position references the accelerometers measure the acceleration of the vehicle along the three different axes; using this acceleration information provided by the accelerometers it is possible to determine the trajectory of movement of the vehicle and thus determine the angular orientation of the vehicle as it moves along the one or more position references. As the vehicle cooperates to move along the one or more position references, the angular orientation of the vehicle will correspond to the angular orientation of the one or more position references. Preferably, the means for measuring angular orientation comprises a gyroscope. The means for measuring angular orientation is preferably configured to measure the angular variation of the position reference as a function of distance along the position reference.

The measuring means may comprise a motor which is configured to move, a means for measuring angular orientation, along a track which defines a position reference. The motor may be configured to be remotely operated. The measuring means may comprise a vehicle which can carry a means for measuring angular orientation. The vehicle may be configured to move along a track which defines a position reference. The vehicle may be configured to be remotely controllable. The means for measuring angular orientation may be configured to measure the angular orientation of the vehicle as it moves along a track which defines a position reference. The angular orientation of the position reference may be determined from the measured angular orientation of the vehicle. The motor and/or vehicle may be configured for underwater use and/or land use. The term 'vehicle' includes any movable assembly, or movable carrier. The vehicle may carry the measuring means e.g. gyroscope, and may be mechanically coupled to the one or more position references so that the vehicle can move along the one or more position references. As the vehicle moves along the one or more position references the gyroscope measures the angular orientation of the vehicle as it moves along the one or more position references; the angular orientation of the vehicle corresponds to the angular orientation of the one or more position references.

The means for measuring angular orientation may be any means for measuring angular displacement of the one or more position references either, mechanically, magnetically or optically. For mechanically coupled, the measuring means will follow the position reference and rotate as the position reference is twisted; this rotation is measured by the measuring means and the angle of rotation angle is used to determine the angular position of the sensors. For example, the mechanically coupled measuring means may comprise a vehicle which comprises a gyroscope attached thereto, wherein the one or more position references define a track which the vehicle can mechanically cooperate with and move along. For magnetically and optically coupled system, the measuring means is rotated using actuators so that the reference is always is the same position with respect to the measuring means. Thus measuring means changes its angular orientation to follow the position reference. The rotation of the measuring means is measured.

The measuring means may further comprise a means for storing angular orientation measurements taken by the means for measuring angular orientation. The measuring means may further comprise a memory which stores angular orientation measurements taken by a means for measuring angular orientation, over a length of the structure which is monitored for strain. The measuring means may further comprise a transmission system to forward the angular information to an operator for online signal processing. The measuring means may further comprise a means to communicate the angular orientation measurements taken by a means for measuring angular orientation.

The measuring means may comprise a means for measuring angular displacement and a means for moving the means for measuring angular displacement. The means for moving the means for measuring angular displacement may be a motor which is configured to move the means for measuring angular displacement so that the means for measuring angular displacement can follow along a length of a position reference. For example, the measuring means may comprise a camera which comprises a gyroscope fixed thereto so that the angular orientation of the camera can be determined, and a motor which can move the camera linearly along a length of a position reference. A means for moving the camera along the length of the position reference may also be provided e.g. a poll to which the camera is attached, or a motor which cooperates with the camera. The camera will provide images to a user; and the user can manoeuvre the camera using the motor or poll so that a position reference remains visible in the images provided by the camera. For example, in regions where the position reference is displaced the motor or poll may be used to manoeuvre the camera so that a position reference remains visible in the images provided by the camera. The gyroscope may record the orientation of the camera as it is moved to follow the displaced position reference. Likewise, one or more magnetic elements may define the one or more position references. The measurement means may comprise a magnetic senor which can measure magnetic field provided by the magnetic elements; a gyroscope may be attached to the magnetic sensor so that the angular orientation of the magnetic sensor can be measured. The magnetic sensor may be moved to follow the magnetic field provided by the magnetic elements which define the one or more position references; as the magnetic sensor is moved its angular orientation is measured by the gyroscope.

The two or more strain sensors may each comprise an optical fiber. The two or more strain sensors may each comprise and Fiber Bragg Grating (FBG) and/or strain gauge.

The combined measured strain information allows computing the bending radius and orientation. Rebuilding 3-dimensional bending orientation. It is well known in the art how to compute a bending radius and orientation. For example, bending radius and orientation can be deduced by measuring Brillouin frequency shift of the backscattered signals propagating in three distinct fiber sensors. The sensors are secured along a structure at positions of "12 o'clock", "4 o'clock" and "8 o'clock". In a section of the structure where bending occurs, each sensor will experience distinct strain effect with different quantities and different signs: positive sign for fiber traction and negative sign for fiber compression. Then the unknown parameters of interest (bending radius and orientation) can be determined by trigonometry relationships between three distinct strain values measured by three strain sensors. The measured angular orientation of the position reference along a length of the position reference will provide information regarding the degree twist of a structure with which the position reference cooperates. The measured strain may be used to compute the bending direction along the structure. The measured strain may be used to compute the bending orientation and bending radius of a structure. A mathematical model of the structure may be used in the computation of the bending direction and bending radius.

According to a further aspect of the present invention there is provided a strain sensor apparatus component comprising, two or more strain sensors each of which is capable of measuring strain and each of which is configured such that it can be arranged to cooperate with a structure to be monitored so that strain in the structure can be detected by a strain sensor, and     one or more position references which is/are arranged in a predetermined position relative to the two or more strain sensors and wherein the one or more position references are each configured such that they are suitable for cooperating with a measuring means so that the measuring means can determine the angular orientation of the one or more position references.

According to a further aspect of the present invention there is provided an assembly, the assembly comprising a structure which is to be monitored for strain, and a strain sensor apparatus according to any one of the above mentioned strain sensor apparatus.

According to a further aspect of the present invention there is provided a method for sensing strain in a structure comprising the steps of, providing a strain sensor apparatus according to any of the above-mentioned strain sensors;

detecting strain in the structure, and determining the position in the structure where the detected strain is present, using the two or more strain sensors;

measuring the angular orientation of the one or more references at the position in the structure where the strain is present, using a measuring means;

determining the angular orientation of the two or more strain sensors from the measured angular orientation of the one or more references;

determining the direction in which strain is applied to the structure from the determined angular orientation of the two or more strain sensors.

The steps of detecting strain in the structure, and determining the position in the structure where the detected strain is present, may comprise the step of carrying out distributed fiber optic analysis of a backscattered signal propagated in an optical fiber of a strain sensor.

The method may further comprise the steps of calculating the bending orientation and/or bending radius of a structure. As previously described it is well known in the art the manner in which these steps may be carried out.

BRIEF DESCRIPTION OF THE DRAWINGS

The invention will be better understood with the aid of the description of an embodiment, given by way of example only, and illustrated by the figures, in which.

DETAILED DESCRIPTION OF POSSIBLE EMBODIMENTS OF THE INVENTION

Figure 1:
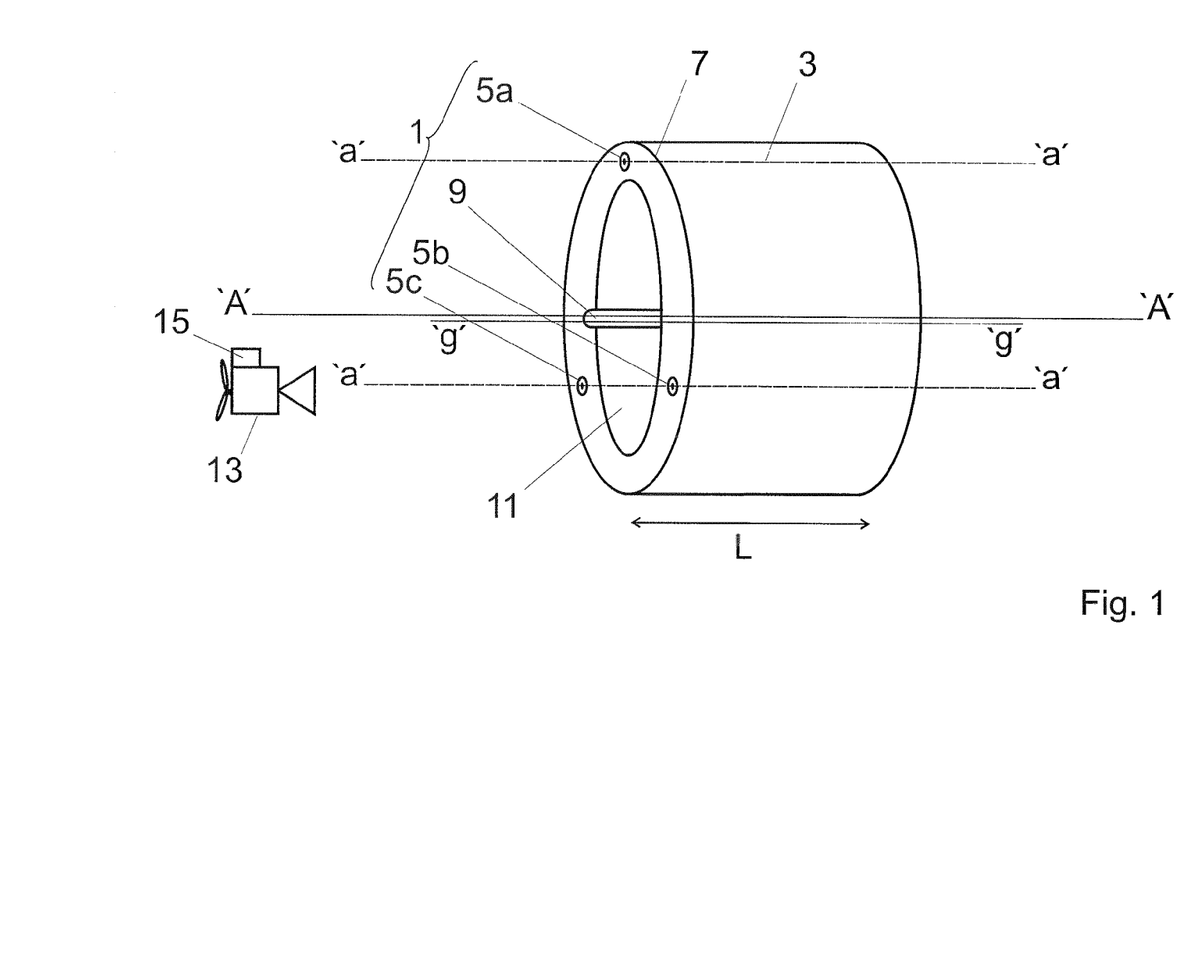
FIG. 1 provides a perspective view of strain sensor apparatus, according to one embodiment of the present invention, which has been integrated into a tubular structure.

FIG. 1 provides a perspective view of strain sensor apparatus 1, according to one embodiment of the present invention, which is been integrated into a tubular structure 3. In the example embodiment shown in FIG. 1, the tubular structure 3 is a pipe which is configured for use in a sub-sea application, such as sub-sea oil drilling. The tubular structure 3 comprises a longitudinal axis 'A', the tubular structure extends along the longitudinal axis 'A' so that the tubular structure is an elongate structure having a length 'L'.

The strain sensor apparatus 1 comprises three strain sensors 5a-c each of which is capable of measuring strain. The three strain sensors 5a-c are integral to the tubular structure 3 and are equally distributed around a circumference 7 of the tubular structure 3; strain sensor 5a is located at the '12 o clock' position (0°), strain sensor 5b is located at the '4 o clock' position (120°), and strain sensor 5c is located at the '8 o clock' position (240°). Each of the strain sensors 5a-c comprise an central axis 'a', and each of the strain sensors 5a-c extend along this central axis 'a' so that each strain sensor 5a-c has an elongate configuration. Each strain sensor 5a-c extends, parallel to the longitudinal axis 'A' of the tubular structure 3, along the whole length 'L' of the tubular structure 3. It will be understood that the strain sensors 5a-c may alternatively be arranged in a helix along the length of the tubular structure 3.

The sensing apparatus 1 further comprises a position reference in the form of a groove 9 which is also integral to the tubular structure 3. The groove 9 is located at a predetermined position relative to the three strain sensors 5a-c; in this particular example the groove 9 is located at the '9 o clock' position on the circumference 7 of the tubular structure 3. The groove 9 also comprises a central axis 'g', and the groove 9 extends along this central axis 'g' so that the groove 9 has an elongate configuration. The groove 9 also extends parallel to the longitudinal axis 'A' of the tubular structure 3, along the whole length 'L' of the tubular structure 3.

Any suitable measurement means, may be used to cooperate with the groove 9 so that the angular orientation of the groove 9 can be determined at any longitudinal position along the structure. For example, a camera 13 which has a gyroscope 15 attached thereto, may be moved along an inside 11 of the tubular structure 3, to cooperate with the groove 9 by providing images of the groove 9. The camera 13 may be arranged to provide real time images to a user who controls the angular orientation of the camera. The camera comprises a motor 17 which can be controlled remotely; the motor 17 allows the camera to be maneuvered. It will be understood that the camera not necessary need to have a motor 17; the camera may attached to an end of a poll and may be maneuvered by a user using the poll. The camera 13 is moved along the inside of the tubular structure 3 and the orientation of the camera 13 is moved by the user so that the groove 9 always remains visible on the images provided by the camera 13. Thus, if the angular position of the groove 9 has be displaced due to a twist in the tubular structure 3, as the camera 13 is moved by the user to follow the groove 9. The gyroscope 15 will record the angular displacement of the camera 13 as it is moved to follow the groove 9. The angular displacement of the camera 13 will thus correspond to the angular displacement of the groove 9; and thus the angular displacement recorded by the gyroscope 15 will correspond to the angular displacement of groove 9 due to the twist in the tubular structure 3. The gyroscope 15 records the angular position of the camera 13 as it is moved to follow the groove 9 along the whole length 'L' of the tubular structure 3; accordingly, at any position along the tubular structure 3 the angular position of the groove 9 can be determined.

As the groove 9 has a known fixed position relative to the three strain sensors 5a-c, the angular orientation of the of each of the three strain sensors 5a-c, at any point along the length 'L' of the tubular structure 3, can be determined from the determined angular orientation of the groove 9. If, for example, the strain sensor 5a detects that strain is present at a particular point along the length 'L' of the tubular structure 3, the angular orientation of the strain sensor 5a at that particular point can be determined on the basis of the angular orientation of the groove 9 at that particular point of the tubular structure 3 (as measured by the gyroscope on the camera). The angular orientation of the strain sensor 5a will indicate the direction of strain on the tubular structure 3 at that point. For example, if strain sensor 5a detects strain is present at a particular point 50 meters along the length 'L' of the tubular structure 3, and the angular orientation of the strain sensor 5a at that particular point 50 meters along the length 'L' of the tubular structure 3 is determined to be 90° (i.e. at the '3 o clock' position on the circumference 7 of the tubular structure 3); then it can be determined that the strain present at the particular point 50 meters along the length 'L' of the tubular structure 3, is being applied at the '3 o clock' position on the circumference 7 of the tubular structure 3 i.e. the stain is being applied perpendicular to the tubular structure 3.

It should be understood that the position reference is not limited to being a groove 9. The position reference may take any suitable form. For example the position reference may be a track. The track may be defined by any suitable means, for example a groove or projection may define a track. The track may be configured to cooperate with a measurement means which can measure angular orientation as it moves along the track. It should also be understood that the measuring means is not limited to a camera with a gyroscope. The measuring means may be for example a vehicle which comprises a gyroscope. The vehicle may be configured such that it can move along a position reference in the form of a track. For example the vehicle may comprise a rail or wheels which can cooperate with the track. As the vehicle moves along the track, the gyroscope measures the angular orientation of the vehicle. The measured angular orientation of the vehicle will correspond to the angular orientation of the track i.e. the position reference. The angular orientation of the strain sensors can in turn be determined from the angular orientation of the track i.e. the position reference.

Figure 2:
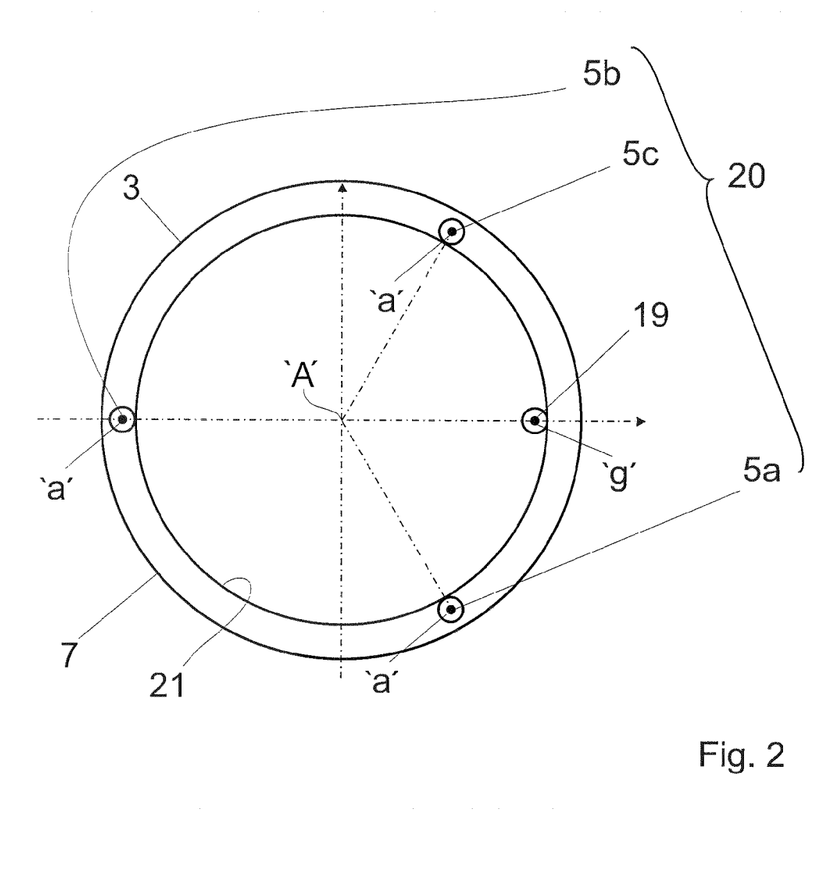
FIG. 2 provides a cross-sectional view of a strain sensor apparatus according to a further embodiment of the present invention.

FIG. 2 provides a cross-sectional view of a strain sensor apparatus 20 according to a further embodiment of the present invention. The strain sensor apparatus 20 has many of the same features as the strain sensor apparatus 1 shown in FIG. 1 and like features are awarded the same reference numbers. Like the sensing apparatus 1 shown in FIG. 1 the strain sensor apparatus 20 depicted in FIG. 2 is integral to a tubular structure 3.

The strain sensor apparatus 20 shown in FIG. 2 differs from the strain sensor apparatus 1 shown in FIG. 1, in that the position reference takes the form of a elongate projection 19 which extends along the length of the tubular structure 3. The projection 19 is fixed to an inner surface 21 of the tubular structure 3. The projection 19 is located at a predetermined angular position, relative to the three strain sensors 5a-c. The projection 19 also comprises an axis 'g', and the projection 19 extends along this central axis 'g' so that the projection 19 has an elongate configuration. The projection 19 also extends parallel to the longitudinal axis 'A' of the tubular structure 3, along the whole length 'L' of the tubular structure 3.

The projection 19 defines a track along which a measuring means can move. For example, the projection 19 may define a track along which a vehicle which comprises a gyroscope can move; as vehicle moves along the track the gyroscope measures the angular orientation of the vehicle. The measured angular orientation of the vehicle will correspond to the angular orientation of the track; as the projection 19 (i.e. track) is in a known fixed position relative to the strain sensors 5a-c, the angular orientation of each of the strain sensors 5a-c at any point along the length 'L' of the tubular structure 3, can be derived from the angular orientation measurements taken by the gyroscope of the vehicle at that point. Thus, the direction of strain along the length of the tubular structure 3 can be determined.

Figure 3:
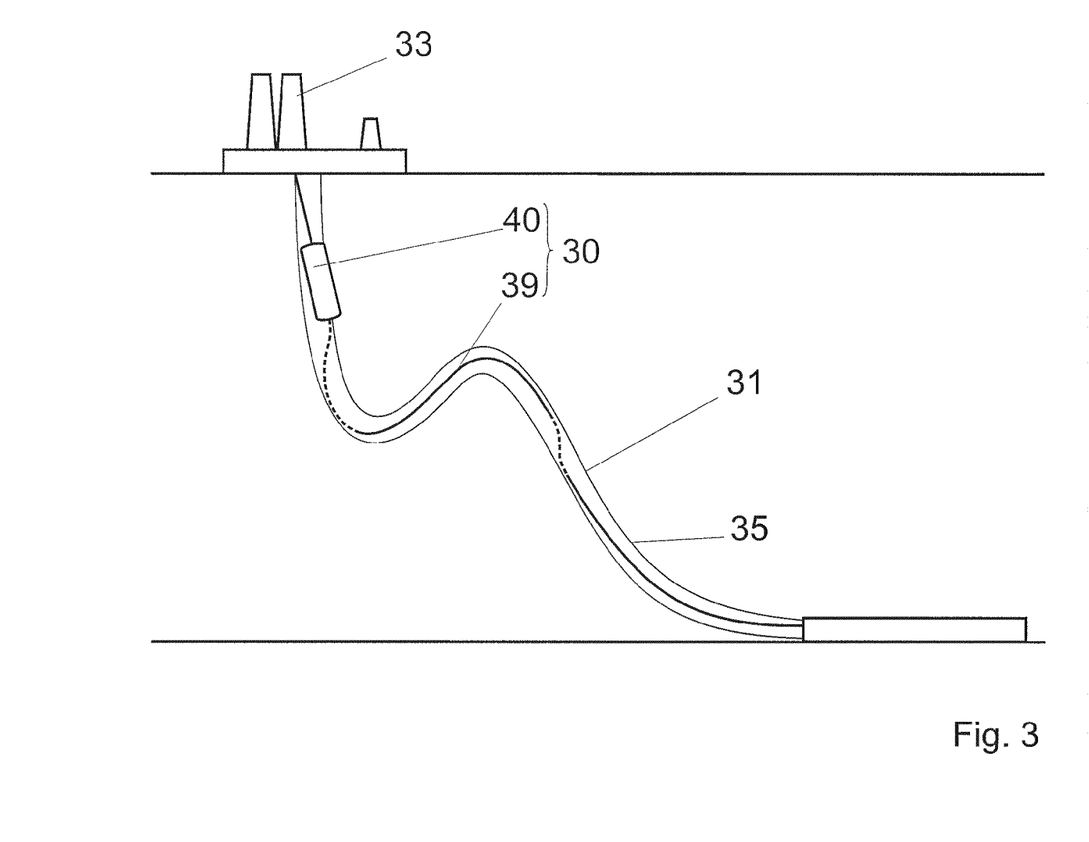
FIG. 3 provides a perspective view of a further embodiment of a strain sensor apparatus according to the present invention, when operation on a subsea umbilical.

FIG. 3 shows a perspective view of a strain sensor apparatus 30 according to a further embodiment of the present invention. The strain sensor apparatus 30 has many of the same features as the strain sensor apparatus 1 shown in FIG. 1 and the strain sensor apparatus 20 shown in FIG. 2, and like features are awarded the same reference numbers.

In the particular example embodiment depicted in FIG. 3, the strain sensor apparatus 30 is incorporated into a subsea umbilical 31 which extends from an offshore vessel 33. Like the strain sensor apparatuses 1 and 20 shown in FIGS. 1 and 2 respectively, the strain sensor apparatus 30 comprises three strain sensors (not shown) which are integral to the umbilical and arranged such that they are equally distributed around a circumference of the subsea umbilical 31. Like the strain sensor apparatuses 1 and 20 shown in FIGS. 1 and 2 respectively, each of the strain sensors have an elongate configuration and each extends, parallel to a longitudinal axis of the subsea umbilical 31, along the whole length of the subsea umbilical 31.

The strain sensor apparatus 30 shown in FIG. 3 differs from the strain sensor apparatuses 1 and 20 shown in FIGS. 1 and 2 respectively, in that the position reference takes the form of a track 39 which is located on an outer surface 35 of the umbilical 31. The track 39 is located at a predetermined angular position, relative to the three strain sensors which are integral to the subsea umbilical 31.

The track 39 is configured to receive a measurement means in the form of a vehicle 40, which comprises a gyroscope (not shown) or some other suitable means for measuring the angular orientation of the vehicle 40. The vehicle 40 is configured such that it can move along the track 39. The vehicle 40 is configured such that its movement along the track 39 can be remotely controlled; thus a user can control the movement of the vehicle 40 along the track 39, from the offshore vessel 33, using a suitable control means. As the vehicle 40 is moved along the track 39, the gyroscope (not shown) records the angular orientation of the vehicle 40. The measured angular orientation of the vehicle 40 will correspond to the angular orientation of the track 39. As the track 39 is in a known fixed angular position relative to the strain sensors, the angular orientation of each of the strain sensors, at any point along the length of the subsea umbilical 31, can be derived from the angular orientation measurements taken by the gyroscope. Thus, the direction of strain applied to the subsea umbilical 31, at any point along the length of the subsea umbilical 31, can thus be determined.

Various modifications and variations to the described embodiments of the invention will be apparent to those skilled in the art without departing from the scope of the invention as defined in the appended claims. Although the invention has been described in connection with specific preferred embodiments, it should be understood that the invention as claimed should not be unduly limited to such specific embodiment.

The invention claimed is:

1. A strain sensor apparatus comprising,
two or more strain sensors each of which is capable of measuring strain and each of which is configured such that it can be arranged to cooperate with an elongate tubular structure to be monitored along a length of the elongate tubular structure, so that strain in the elongate tubular structure can be detected by one or more of said strain sensors;
one or more position references arranged to extend along the length of the elongate tubular structure along which the two or more strain sensors also extend, wherein the one or more position references are in a predetermined position relative to the two or more strain sensors along said length; and
one or more measuring means which comprises a means for measuring angular orientation, wherein the one or more measuring means is configured to cooperate with the one or more position references so that an angular orientation of the one or more position references in a transverse plane through the tubular structure can be determined,
wherein the one or more position references are each configured to cooperate with the one or more measuring means.

2. The strain sensor apparatus according to claim 1 wherein each of the two or more strain sensors comprise at least one optical fiber which is arranged to cooperate with the elongate tubular structure to be monitored, wherein each optical fiber is arranged in optical communication with a means for carrying out distributed fiber optic analysis to detect strain in an optical fiber.

3. The strain sensor apparatus according to claim 2, wherein the at least one optical fiber, of each of the two or more strain sensors, is arranged such that it is fixed to a structure to be monitored.

4. The strain sensor apparatus according to claim 1, wherein the one or more position references comprise a track which is configured such that the one or more measuring means can be moved along it.

5. The strain sensor apparatus according to claim 1, wherein the one or more position references comprise a marking which is configured such that the marking is visible on a camera image of the marking.

6. The strain sensor apparatus according to claim 1, wherein the one or more position references comprise a one or more magnetic elements, which can cooperate with a magnetic field measurement means.

7. The strain sensor apparatus according to claim 1, wherein the one or more measuring means comprises a vehicle, wherein the vehicle is configured such that it can be moved along a track which defines at least one of the one or more position references, and wherein the means for measuring angular orientation is arranged to be in cooperation with the vehicle such that the angular orientation of the vehicle can be measured as it moves along the track.

8. The strain sensor apparatus according to claim 7, wherein the means for measuring angular orientation comprises a gyroscope.

9. The strain sensor apparatus according to claim 1, wherein the one or more measuring means comprises a camera which is configured to provide an image of a position reference, and a means to move the camera so that the camera can be moved to follow at least one or the one or more position references, and wherein the means for measuring angular orientation is arranged to be in cooperation with the camera such that the angular orientation of the camera can be measured as the camera is moved to follow the position reference.

10. The strain sensor apparatus according to claim 1, wherein the measuring means comprises a magnetic field measurement means which is configured to detect the magnetic field of one or more magnetic elements which define a position reference, and a means to move the magnetic field measurement means so that the magnetic field measurement means can be moved to a position where the magnetic field of one or more magnetic elements is present; and wherein the angular orientation measurement means is arranged to be in cooperation with the magnetic field measurement means such that the angular orientation of the magnetic field measurement means can be measured as the magnetic field measurement means is moved to follow the magnetic field of one or more magnetic elements.

11. The strain sensor apparatus according to claim 1, wherein each of the one or more measuring means further comprises a means to store angular orientation measurements taken by the means for measuring angular orientation.

12. The strain sensor apparatus according to claim 1, wherein each of the one or more position reference is arranged to extend along a length of the structure to be monitored.

13. A method for sensing strain in a structure comprising steps of:
providing a strain sensor apparatus according to claim 1;
detecting strain in the structure, and determining a position in the structure where the detected strain is present, using the two or more strain sensors;
measuring the angular orientation of the one or more position references at the position in the structure where the strain is present, using the means for measuring angular orientation;
determining an angular orientation of the two or more strain sensors from the measured angular orientation of the one or more position references;
determining a direction in which strain is applied to the structure from the determined angular orientation of the two or more strain sensors.

14. The method according to claim 13 wherein the steps of detecting strain in the structure, and determining the position in the structure where the detected strain is present, comprises a step of carrying out distributed fiber optic analysis of a backscattered signal propagated in an optical fiber of a strain sensor.

15. The method according to claim 13 further comprising a step of calculating the bending orientation and/or bending radius of a structure.

16. The strain sensor apparatus according to claim 1 wherein the means for measuring angular orientation is configured for measuring the angular orientation of at least one of the one or more position references relative to a longitudinal axis of the elongate tubular structure.

17. The strain sensor apparatus according to claim 1 wherein the means for measuring angular orientation is configured for measuring the angular orientation of the two or more strain sensors.

18. The strain sensor apparatus according to claim 1, wherein the one or more position references are fixed to the elongate tubular structure.

19. A strain sensor apparatus comprising:
two or more strain sensors each of which is capable of measuring strain and each of which is configured such that it can be arranged to cooperate with an elongate tubular structure to be monitored, along a length of the elongate tubular structure, so that strain in the elongate tubular structure can be detected by one or more of said strain sensors;
one or more position references, which is/are arranged, along the length of the elongate tubular structure, in a predetermined position relative to the two or more strain sensors; and
one or more measuring means which comprises a means for measuring angular orientation, wherein the one or more measuring means is configured to cooperate with the one or more position references so that an angular orientation of the one or more position references can be determined,
wherein the one or more position references are each configured such that they are suitable for cooperating with a measuring means, and
wherein the one or more position references comprise a one or more magnetic elements, which can cooperate with a magnetic field measurement means.

20. A strain sensor apparatus comprising:
two or more strain sensors each of which is capable of measuring strain and each of which is configured such that it can be arranged to cooperate with an elongate tubular structure to be monitored, along a length of the elongate tubular structure, so that strain in the elongate tubular structure can be detected by one or more of said two or more strain sensors;
one or more position references arranged to extend along a length of the elongate tubular structure along which the two or more strain sensors also extend, wherein the one or more position references are in a predetermined position relative to the two or more strain sensors along that length; and one or more measuring means which comprises a means for measuring angular orientation, wherein the one or more measuring means is configured to cooperate with the one or more position references so that the position(s) occupied by the one or more position references can be determined by measuring an angular orientation of the one or more position references, and wherein the position(s) are defined on a circumference whose centre is defined by a longitudinal axis of the elongate tubular structure, and wherein the one or more position references are each configured such that they are suitable for cooperating with the one or more measuring means.

21. A strain sensor apparatus comprising:

two or more strain sensors each of which is capable of measuring strain and each of which is configured such that it is arranged to be fixed to and cooperate with an elongate tubular structure to be monitored along the length of the elongate tubular structure, so that strain in the elongate tubular structure can be detected by one of the two or more strain sensors;

one or more position references, which is/are arranged, along the length of the elongate tubular structure, in a predetermined position relative to the two or more strain sensors; and one or more measuring means which comprises a means for measuring angular orientation, wherein the means for measuring angular orientation is configured for measuring an angular orientation of at least one of the one or more position references.

22. A strain sensor apparatus comprising:

two or more strain sensors each of which is capable of measuring strain and each of which is configured such that it can be arranged to cooperate with an elongate tubular structure to be monitored, along a length of the elongate tubular structure, so that strain in the elongate tubular structure can be detected by one or more of said strain sensors;

one or more position references, which is/are arranged, along the length of the elongate tubular structure, in a predetermined position relative to the two or more strain sensors; and one or more measuring means which comprises a means for measuring angular orientation, wherein the one or more measuring means is configured to cooperate with the one or more position references so that an angular orientation of the one or more position references can be determined, wherein the one or more position references are each configured such that they are suitable for cooperating with a measuring means, and wherein the one or more measuring means comprises a magnetic field measurement means which is configured to detect the magnetic field of one or more magnetic elements which define a position reference, and a means to move the magnetic field measurement means so that the magnetic field measurement means can be moved to a position where the magnetic field of one or more magnetic elements is present; and wherein the means for measuring angular orientation is arranged to be in cooperation with the magnetic field measurement means such that the angular orientation of the magnetic field measurement means can be measured as the magnetic field measurement means is moved to follow the magnetic field of one or more magnetic elements.

23. A strain sensor system comprising:

an elongate tubular structure;

two or more strain sensors fixed to the elongate tubular structure, wherein the two or more strain sensors are arranged along the length of the elongate tubular structure, and each of the two or more strain sensors is configured for measuring strain and cooperates with an elongate tubular structure to be monitored, so that strain in the elongate tubular structure is detected by one of the two or more strain sensors;

one or more position references, which is/are arranged, along the length of the elongate tubular structure, in a predetermined position relative to the two or more strain sensors; and one or more measuring means which comprises a means for measuring angular orientation, wherein the means for measuring angular orientation is configured for measuring an angular orientation of at least one of the one or more position references.

\* \* \* \* \*